April 17, 1962 H. K. PRICE 3,029,891
POWER STEERING MECHANISM WITH IGNITION SAFETY DEVICE
Filed Feb. 12, 1960 3 Sheets-Sheet 2
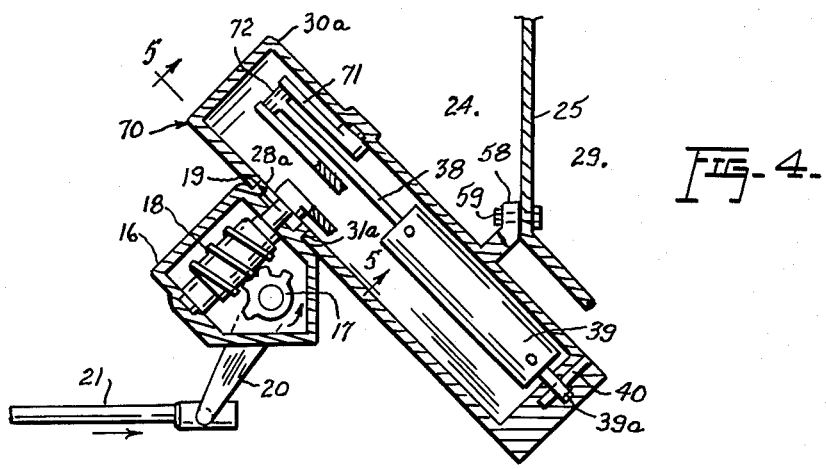
FIG-4-
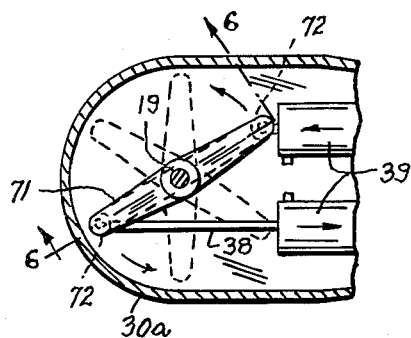
FIG-5-
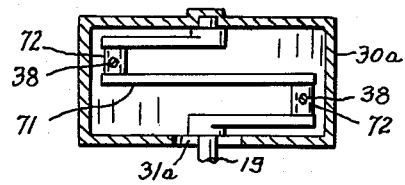
FIG-6-
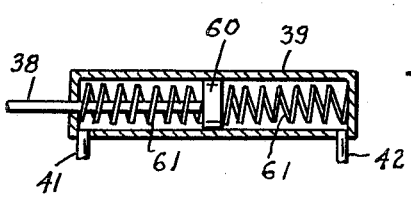
FIG-7-
INVENTOR
Hollas K. Price
BY *Munson H Lane*
ATTORNEY April 17, 1962    H. K. PRICE    3,029,891
POWER STEERING MECHANISM WITH IGNITION SAFETY DEVICE
Filed Feb. 12, 1960    3 Sheets-Sheet 3
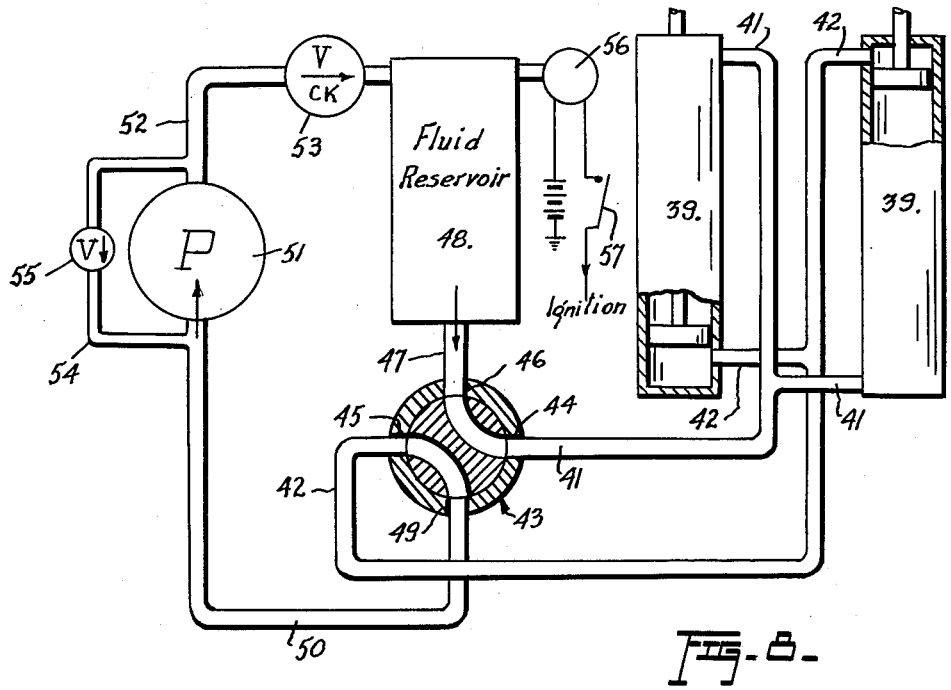
FIG-8-
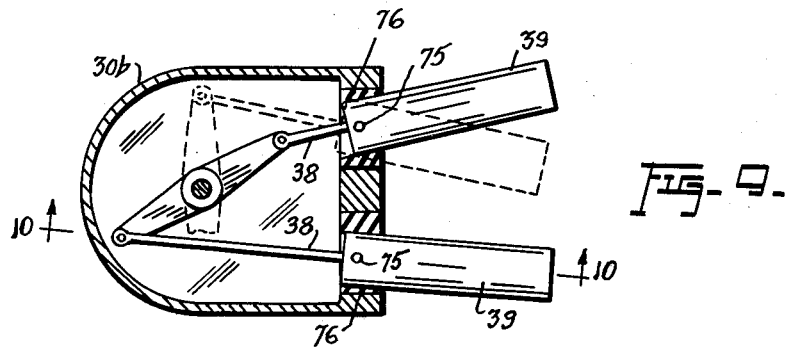
FIG-9-
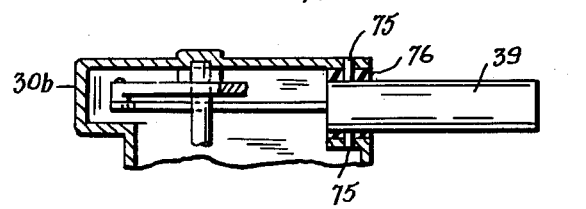
FIG-10-
INVENTOR
Hollas K. Price
BY
ATTORNEY

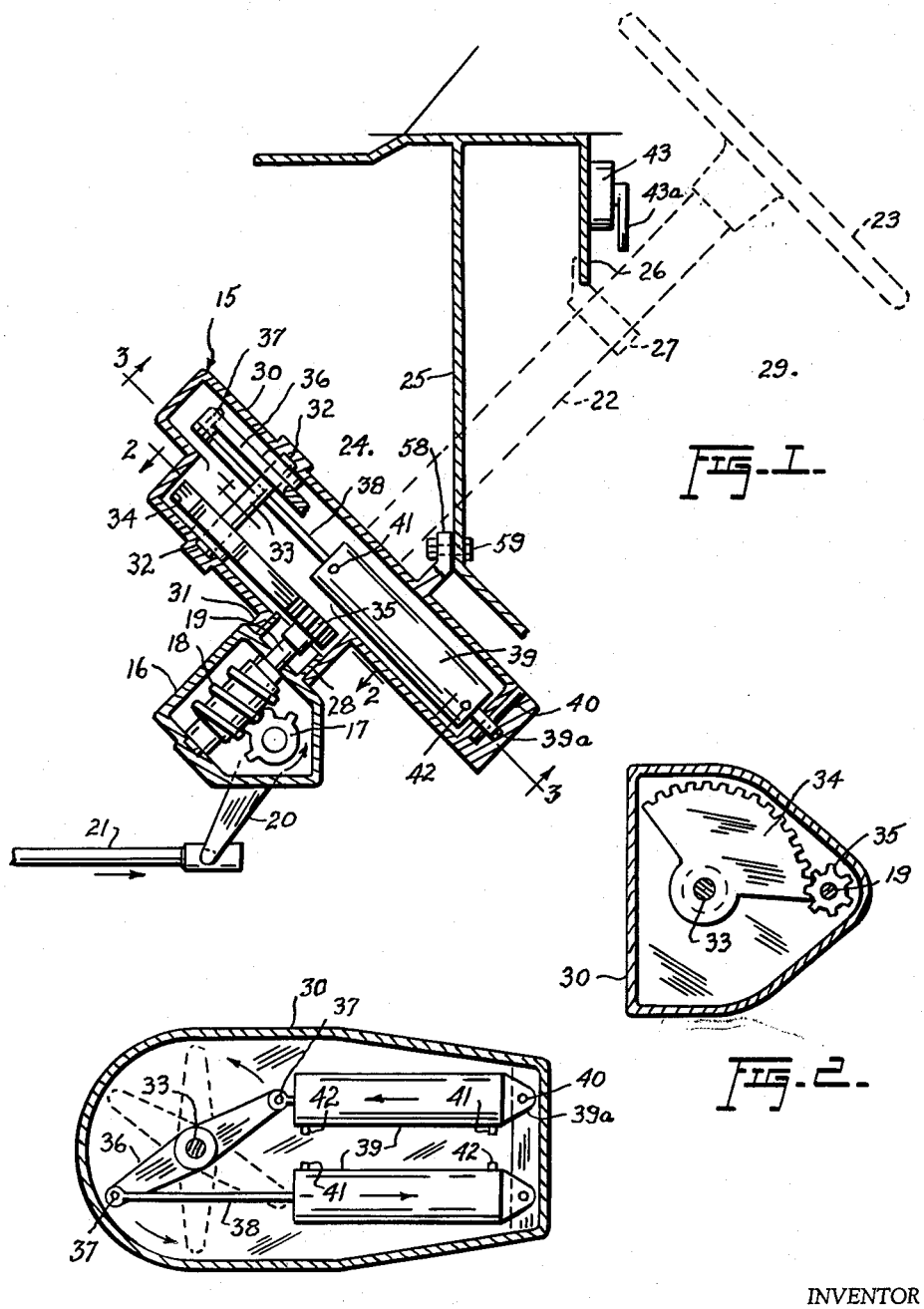

United States Patent Office 3,029,891
Patented Apr. 17, 1962

3,029,891
POWER STEERING MECHANISM WITH IGNITION SAFETY DEVICE
Hollas K. Price, Box 701, Oak Hill, W. Va.
Filed Feb. 12, 1960, Ser. No. 8,309
5 Claims. (Cl. 180—82)

This invention relates to new and useful improvements in power steering mechanisms for automobiles, trucks and other vehicles, and the principal object of the invention is to eliminate the presence of the conventional steering column and steering wheel in the driver's compartment of such vehicles.

As is well known, in instances of collision the driver often sustains a serious or fatal injury by being crushed against the steering wheel or impaled on the steering column directly in front of him, and by eliminating the steering column and wheel from the driver's compartment, the above mentioned hazard does not present itself. Thus, an important feature of the invention resides in the provision of power means for actuating the steering mechanism without the use of a steering column and wheel in the driver's compartment, the invention being particularly adapted for use on existing, conventional vehicles wherein the upper portion of the steering column which extends into the driver's compartment may be cut off and removed together with the steering wheel and the power steering mechanism in accordance with the invention attached and operatively connected to the remaining lower portion of the steering column, outside and forwardly of the driver's compartment.

As such, one embodiment of the invention is in the form of an accessory for conventional vehicle steering gear, while another embodiment of the invention is adapted for use as original equipment of newly manufactured steering gear.

Some of the advantages of the invention reside in its simple construction, efficient operation, and in its adaptability for use with steering gear of various types.

With the foregoing more important objects and features in view and such other objects and features as may become apparent as this specification proceeds, the invention will be understood from the following description taken in conjunction with the accompanying drawings, wherein like characters of reference are used to designate like parts and wherein:

FIGURE 1 is a vertical sectional view showing one embodiment of the invention, particularly adapted for use with conventional steering gear wherein the upper portion of the steering column indicated by dotted lines have been removed;

FIGURE 2 is a sectional view, taken substantially in the plane of the line 2—2 in FIGURE 1;

FIGURE 3 is a sectional view, taken substantially in the plane of the line 3—3 in FIGURE 1;

FIGURE 4 is a vertical sectional view of a modified embodiment of the invention, particularly adapted for use in new installations;

FIGURE 5 is a fragmentary sectional view, taken substantially in the plane of the line 5—5 in FIGURE 4;

FIGURE 6 is a sectional view, taken substantially in the plane of the line 6—6 in FIGURE 5;

FIGURE 7 is a longitudinal sectional view of one of the power cylinders used in the invention;

FIGURE 8 is a diagrammatic illustration of the connections of the various components of the power system;

FIGURE 9 is a sectional view, similar to those shown in FIGURES 3 and 5 but showing a modified embodiment of the cylinder mounting means; and FIGURE 10 is a fragmentary sectional view, taken substantially in the plane of the line 10—10 in FIGURE 9.

Referring now to the accompanying drawings in detail, particularly to FIGURES 1-3, the power steering mechanism in accordance with the invention is designated generally by the reference numeral 15 and, in this embodiment thereof, is intended for use as an accessory for conventional steering gear which includes the usual steering box 16 having a toothed sector shaft 17 therein in mesh with a worm 18 on the lower end of a steering shaft 19, as will be clearly apparent. The sector shaft 17 projects outwardly from the box 16 to carry a pitman arm 20 having a drag link 21 connected thereto, the drag link, in turn, being operatively connected to steerable wheels of the vehicle in the usual manner.

The shaft 19 ordinarily extends upwardly from the box 16 through a tubular jacket 22 which, together with the shaft, constitutes the steering column, provided at its upper end with a steering wheel 23. Wtih the box 16 located in the engine compartment 24, the steering column extends through the usual firewall 25 and is fastened to the dashboard 26 by a suitable clamp 27, all in accordance with conventional practice.

When the power steering mechanism is to be installed, the steering column jacket 22 is completely removed from its adapter 28 on the steering box 16 and the steering shaft 19 is cut away slightly above the adapter 28, so that the presence of the steering column, including the wheel 23, in the driver's compartment 29 is completely eliminated.

The mechanism 15 comprises a suitable housing 30 having a collar portion 31 adapted to be secured to the adapter 28 of the steering box 16 in any suitable manner and provided with bearings 32 for a shaft 33 which is disposed in spaced parallel relation to the steering shaft 19. The shaft 33 has secured thereto a toothed sector 34 of a relatively large radius which meshes with a pinion 35 of a relatively small diameter secured to the shaft 19, whereby partial rotation of the shaft 33 produces sufficient rotation of the shaft 19 to actuate the pitman arm 20 and drag link 21 for steering purposes.

The shaft 33 also has secured thereto a double arm crank 36, the opposite ends of which are pivotally connected as at 37 to reciprocable piston rods 38 of a pair of fluid operators such as hydraulic cylinders 39 which are also disposed in the housing 30. The cylinders 39 are provided with apertured ears 39a pivotally mounted on pins 40 in the housing, whereby the cylinders may swing from side to side or oscillate in the housing during reciprocation of the piston rods 38 while the pivot connections 37 travel in arcuate paths about the axis of the shaft 33. The cylinders 39 are double-acting, having fluid conduits 41, 42 connected to opposite ends thereof in the manner best shown in FIGURE 8, whereby they may be actuated in relatively opposite directions by admission of fluid under pressure into either conduit and discharge of fluid through the other conduit, under the control of a four-way valve 43. The latter, equipped with an actuating handle 43a, may be mounted on the dashboard 26 or at some other convenient location in the driver's compartment 29.

When the steerable wheels of the vehicle are in a straight-ahead position, the center portion of the toothed sector 34 engages the pinion 35 while the valve 34 is set so that fluid is not admitted to either of the cylinders 39. However, by actuating the valve 43 so as to admit fluid under pressure to either end of one cylinder and the relatively opposite end of the other cylinder, the piston rods 38 are slid so as to cause, through the medium of the double arm crank 36, rotation of the shaft 33 in one direction or the other, as desired, thus rotating the steering shaft 19 through the sector 34 and pinion 35 and consequently steering the wheels to either left or right. It is to be noted in this connection that the two cylinders 39 act together in rotating the shaft 33 in either direction, so that if for some reason one of the cylinders should become defective or inoperative, the other is still available to perform the work, while with both cylinders in operation, the working load on each is reduced to a half of what it would be if only one cylinder were employed.

The conduits 41, 42 preferably are in the form of flexible hoses which extend from the cylinders outwardly from the housing 30 and permit the cylinders to oscillate during operation, as already explained.

Referring again to FIGURE 8, it will be observed that the conduits 41, 42 are connected to two ports 44, 45, respectively, of the four-way valve 43 while one port 46, constituting the inlet port, is connected by a conduit 47 to a fluid pressure tank or reservoir 48. The remaining port 49, which is the discharge port, is connected by a conduit 50 to the inlet of a motor-driven pump 51, the outlet of which, in turn, is connected by a conduit 52 to the tank 48 through a check valve 53. Thus, when the pump 51 is in operation and pressure is built up in the conduit 52 to open the valve 53, fluid under pressure is admitted into the tank 48 from which it may be delivered, upon actuation of the valve 43, to actuate the cylinders 39 in either direction, while fluid returning from the cylinders to the valve 43 is recirculated through the pump. A suitable by-pass 54, with a pressure release valve 55, is provided for recirculating the fluid around the pump 51 when the valve 43 is closed, and it will be noted that in the event of pump failure, the check valve 53 will prevent fluid from backing up from the tank 48 to the pump 51, so that ample fluid pressure remains in the tank to actuate the steering mechanism long enough for the vehicle to be brought to a standstill after pump failure is detected.

A pressure-responsive electric switch 56 is provided on the tank 48 and connected in series with the usual ignition switch 57, the switch 56 being normally closed when the engine is in operation and the pump 51 is maintaining fluid pressure in the tank 48. However, when the pump 51 becomes inoperative and fluid pressure in the tank 48 drops sufficiently, the switch 56 opens and interrupts flow of current to the ignition system, thus automatically stopping the vehicle to prevent steering failure upon depletion of fluid pressure in the tank 48.

The housing 30 may be provided with suitable seals (not shown) and filled with oil or grease to lubricate the working parts therin, and if desired, a bracket 58 may be provided on the housing for attachment to the firewall 25 by a suitable bolt 59.

FIGURE 7 illustrates the internal arrangement of the cylinders 39 which, as will be noted, have a piston 60 secured to the inner end of the piston rod 38, while a pair of compression springs 61 are provided in the cylinder in abutment with opposite sides of the piston for urging the same to a central position wherein the steerable wheels of the vehicle are set straight-ahead.

The modified embodiment of the invention designated generally by the reference numeral 70 and shown in FIGURES 4-6 is primarily intended for new steering gear rather than as an accessory for conventional steering gear. As such, the embodiment 70 comprises a housing 30a formed with an aperture 31a for mounting on the adapter 28a of the steering box 16, while the steering shaft 19 is provided with a double throw crankshaft 71 which is disposed in the housing 30a coaxially with and as an extension of the shaft 19.

The arrangement of the crankshaft 71 is best shown in FIGURE 6, wherein it will be noted that the two throws of the crankshaft accommodate bearing sleeves 72 provided at the ends of the piston rods 38 of the two cylinders 39, whereby the crankshaft and the shaft 19 are rotated directly by the cylinders, without the use of an intermediate shaft such as the shaft 33 and gearing 34, 35 used in the embodiment 15. In this instance the ratio of the gears 17, 18 in the steering box 16 is stepped up so that the partial rotation imparted to the shaft 19 by the cylinders 39 is sufficient to adequately actuate the pitman arm 20 for steering purposes.

FIGURES 9 and 10 illustrate modified mounting means for the cylinders 39 which, in this instance, are disposed at the outside of rather than within the housing 30b. The inner end portions of the cylinders are equipped with pairs of trunnions 75 which are pivotally mounted in the housing 30b to facilitate oscillation of the cylinders, and suitable seals of resilient material are provided in the housing around the inner end portions of the cylinders as indicated at 76 to prevent leakage of lubricant out of the housing while facilitating oscillation of the cylinders. This modified cylinder mounting means substantially minimizes the size of the housing and may be used in substitution for the mounting means 39a, 40 in either the embodiment 15 or the embodiment 70.

While in the foregoing there have been described and shown the preferred embodiments of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. In a power steering mechanism, the combination of a steering box, a steering shaft and a pitman arm carrying shaft rotataby journalled in said box, said pitman arm carrying shaft being operatively connected to a drag link, gearing provided in said box and operatively connecting said steering shaft to said pitman arm carrying shaft, a housing secured to and disposed above said steering box, a crank mounted for partial rotation in said housing and operatively connected to said steering shaft, a double-acting hydraulic cylinder carried by said housing and having a reciprocable piston rod connected to said crank for imparting partial rotation thereto, a motor-driven pump, a hydraulic fluid reservoir connected to the outlet of said pump, a four-way control valve in communication with said reservoir and with the inlet of said pump and with said double-acting cylinder for selectively reciprocating said piston rod, and a pressure-responsive switch provided on said reservoir and in circuit with an ignition system, said switch being closed and open in the presence and absence of fluid pressure, respectively, in said reservoir.

2. The device as defined in claim 1 wherein said crank is disposed coaxially with said steering shaft and is secured thereto for rotation therewith.

3. The device as defined in claim 1 together with an intermediate shaft rotatably journalled in said housing in spaced parallel relation from said steering shaft, said crank being secured to said intermediate shaft, and gearing operatively connecting said intermediate shaft to said steering shaft.

4. The device as defined in claim 1 wherein said power cylinder is disposed interiorly of said housing, and means mounting said cylinder for oscillation relative to the housing.

5. The device as defined in claim 1 wherein said power cylinder is disposed exteriorly of said housing, and means mounting said cylinder for oscillation relative to the housing.

References Cited in the file of this patent

UNITED STATES PATENTS

| | | |
|---|---|---|
| 2,421,139 | Barnhart | May 27, 1947 |
| 2,459,334 | Patterson et al. | Jan. 18, 1949 |
| 2,906,361 | Ziskal | Sept. 29, 1959 |